(12) United States Patent
Callahan et al.

(10) Patent No.: US 9,983,817 B2
(45) Date of Patent: May 29, 2018

(54) ADAPTIVE, SELF LEARNING CONSISTENCY POINT TRIGGERS

(71) Applicant: NetApp, Inc., Sunnyvale, CA (US)

(72) Inventors: Travis Ian Callahan, Apex, NC (US); Mrinal K. Bhattacharjee, Bangalore (IN); Ganga Bhavani Kondapalli, Sunnyvale, CA (US); William Arthur Gutknecht, Greensboro, NC (US); Andrew Zhu, Cary, NC (US)

(73) Assignee: NETAPP, INC., Sunnyvale, CA (US)

( * ) Notice: Subject to any disclaimer, the term of this patent is extended or adjusted under 35 U.S.C. 154(b) by 25 days.

(21) Appl. No.: 15/052,246

(22) Filed: Feb. 24, 2016

(65) Prior Publication Data

US 2017/0242611 A1 Aug. 24, 2017

(51) Int. Cl.
*G06F 3/06* (2006.01)
*G06F 17/30* (2006.01)
*H04L 29/08* (2006.01)

(52) U.S. Cl.
CPC .......... *G06F 3/0631* (2013.01); *G06F 3/0604* (2013.01); *G06F 3/067* (2013.01); *G06F 3/0617* (2013.01); *G06F 3/0643* (2013.01); *G06F 3/0644* (2013.01); *G06F 3/0653* (2013.01); *G06F 3/0689* (2013.01); *G06F 17/30138* (2013.01); *G06F 17/30194* (2013.01); *H04L 67/1097* (2013.01)

(58) Field of Classification Search
CPC .... G06F 3/0631; G06F 3/0604; G06F 3/0643; G06F 3/0644; G06F 3/067; G06F 3/0689; G06F 17/30194; G06F 17/30138
See application file for complete search history.

(56) References Cited

U.S. PATENT DOCUMENTS

| | | |
|---|---|---|
| 6,170,067 B1 | 1/2001 | Liu et al. |
| 6,289,356 B1 | 9/2001 | Hitz et al. |
| 8,001,163 B2 * | 8/2011 | Kawamura ........... G06F 3/0625 707/661 |
| 2007/0025242 A1 * | 2/2007 | Tsang ...................... H04L 47/10 370/229 |

(Continued)

OTHER PUBLICATIONS

International Search Report dated May 31, 2017 of PCT International Application No. PCT/US2017/019067.

(Continued)

*Primary Examiner* — David Yi
*Assistant Examiner* — Nicholas A. Paperno
(74) *Attorney, Agent, or Firm* — Klein, O'Neill & Singh, LLP (57) ABSTRACT

Presented herein are methods, non-transitory computer readable media, and devices for allocating resources to a particular volume and triggering a consistency point based on the amount given to each volume, thus providing dynamic consistency point triggers. Methods for providing dynamic consistency point triggers are disclosed which include: determining a volume's capacity to utilize resources based on the volume's performance; receiving an allocation of the divided resources based on total system resources available within the storage system and the volume's performance; and triggering a consistency point upon exhausting a threshold percentage of the received/allocated resources.

14 Claims, 4 Drawing Sheets

(56) References Cited

U.S. PATENT DOCUMENTS

| | | | |
|---|---|---|---|
| 2008/0077735 A1* | 3/2008 | Kishi | G06F 3/0607 |
| | | | 711/113 |
| 2008/0126547 A1* | 5/2008 | Waldspurger | G06F 9/4881 |
| | | | 709/226 |
| 2011/0099149 A1 | 4/2011 | Kim et al. | |
| 2013/0254458 A1* | 9/2013 | Pittelko | G06F 12/02 |
| | | | 711/103 |
| 2014/0181374 A1* | 6/2014 | Ellard | G06F 12/0246 |
| | | | 711/103 |
| 2015/0081636 A1* | 3/2015 | Schindler | G06F 11/1482 |
| | | | 707/639 |
| 2015/0120656 A1 | 4/2015 | Ramnarayanan et al. | |
| 2015/0199388 A1* | 7/2015 | Hrischuk | G06F 17/30289 |
| | | | 707/802 |
| 2015/0331760 A1 | 11/2015 | Dalessandro et al. | |
| 2016/0048351 A1 | 2/2016 | Kanteti et al. | |
| 2017/0187804 A1 | 6/2017 | Callahan et al. | |

OTHER PUBLICATIONS

Written Opinion dated May 31, 2017 of PCT International Application No. PCT/US2017/019067.
Non-Final Office Action on co-pending (U.S. Appl. No. 14/980,940) dated Sep. 8, 2017.
Final Office Action on co-pending (U.S. Appl. No. 14/980,940) dated Dec. 26, 2017.

* cited by examiner

ADAPTIVE, SELF LEARNING CONSISTENCY POINT TRIGGERS

TECHNICAL FIELD

The present disclosure relates generally to mass data storage networks and data storage filing systems. More particularly, aspects of this disclosure relate to methods, non-transitory computer readable media, and devices for providing dynamic consistency point triggers.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. Optical media are also envisioned. The disk or disk array in this context apply to a hard disk drive (HDD) or direct access storage device (DASD).

Storage of information on the disk array is preferably implemented as one or more storage "volumes", defining an overall logical arrangement of disk space. The disks of a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (ie., data disks) and disks configured to store parity for the data (ie., parity disks). The parity may thereafter be retrieved to enable recovery of data lost when a disk fails, or for other purposes.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (VBN) space that is maintained by the file system. The file system organizes the data blocks within the VBN space as a "logical volume"; each logical volume may be, although is not necessarily, associated with its own file system. The file system typically consists of a contiguous range of VBNs, from 0 to n, for a file system of size n−1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout reduces fragmentation, resulting in efficient access operations, particularly for sequential read operations, directed to the disks.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its VBN space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

When accessing a block of a file in response to servicing a client request, the file system specifies a VBN that is translated at the file system/RAID system boundary into a disk block number (DBN) location on a particular disk (disk, DBN) within a RAID group of the physical volume. Each block in the VBN space and in the DBN space is typically fixed, e.g., 4 k bytes (KB), in size; accordingly, there is typically a one-to-one mapping between the information stored on the disks in the DBN space and the information organized by the file system in the VBN space. The (disk, DBN) location specified by the RAID system is further translated by a disk driver system of the storage operating system into a sector (or similar granularity) on the specified disk.

The requested block is then retrieved from disk and stored in a buffer cache of the memory as part of a buffer tree of the file. The buffer tree is an internal representation of blocks for a file stored in the buffer cache and maintained by the file system. Broadly stated, the buffer tree has an Mode at the root (top-level) of the file. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending for example upon the quantity of data in the file. Each pointer may be embodied as a VBN to facilitate efficiency among the file system and the RAID system when accessing the data on disks.

The file system, such as the write-anywhere file system, maintains information about the configuration of the underlying physical disks (e.g., the number of blocks in each disk) in the storage system. The RAID system provides the disk geometry information to the file system for use when creating and maintaining the VBN-to-disk, DBN mappings used to perform write allocation operations. The file system maintains block allocation data structures, such as an active map, a space map, a summary map and snapmaps. These mapping data structures describe which blocks are currently in use and which are available for use and are used by a write allocator of the file system as existing infrastructure for the logical volume.

Specifically, the snapmap denotes a bitmap file describing which blocks are used by a consistency point. The write-anywhere file system has the capability to generate a consistency point of its active file system. An "active file system" is a file system to which data can be both written and read or, more generally, an active store that responds to both read and write I/O operations. A consistency point is a space conservative, point-in-time read-only image of data accessible by name that provides a consistent image of that data (such as a storage system) at some previous time. More particularly, a consistency point is a point-in-time representation of a storage element, such as an active file system, file or database, stored on a storage device (e.g., on disk) or other persistent memory and having a name or other identifier that distinguishes it from other consistency points taken at other points in time. A consistency point can also include other information (metadata) about the file system at the particular point in time for which the image is taken.

The write-anywhere file system supports multiple consistency points that are generally created on a regular schedule, or at prescribed points in time or events. Each consistency point refers to a copy of the file system that diverges from the active file system over time as the active file system is modified. Each consistency point is a restorable version of the storage element (e.g., the active file system) created at a predetermined point in time and, as noted, is "read-only" accessible and "space-conservative." Space conservative denotes that common parts of the storage element in multiple consistency points share the same file system blocks. Generally, only the differences among these various consistency points require extra storage blocks. The multiple consistency points of a storage element are not independent copies, each consuming disk space; therefore, creation of a consistency point on the file system is instantaneous, since no entity data needs to be copied. Read-only accessibility denotes that a consistency point cannot be modified because it is closely coupled to a single writable image in the active file system. The closely coupled association between a file in the active file system and the same file in a consistency point obviates the use of multiple "same" files.

The active map denotes a bitmap file describing which blocks are used by the active file system. As described prior, a consistency point may contain metadata describing the file system as it existed at the point in time that the image was taken. In particular, a consistency point captures the active map as it existed at the time of consistency point creation; this file is also known as the snapmap for the consistency point. Note then that a snapmap denotes a bitmap file describing which blocks are used by a consistency point. The summary map denotes a file that is an inclusive logical OR bitmap of all snapmaps. By examining the active and summary maps, the file system can determine whether a block is in use by either the active file system or any consistency point. The space map denotes a file including an array of numbers that describe the number of storage blocks used in a block allocation area. In other words, the space map is essentially a logical OR bitmap between the active and summary maps to provide a condensed version of available "free block" areas within the vbn space.

Figure 1:
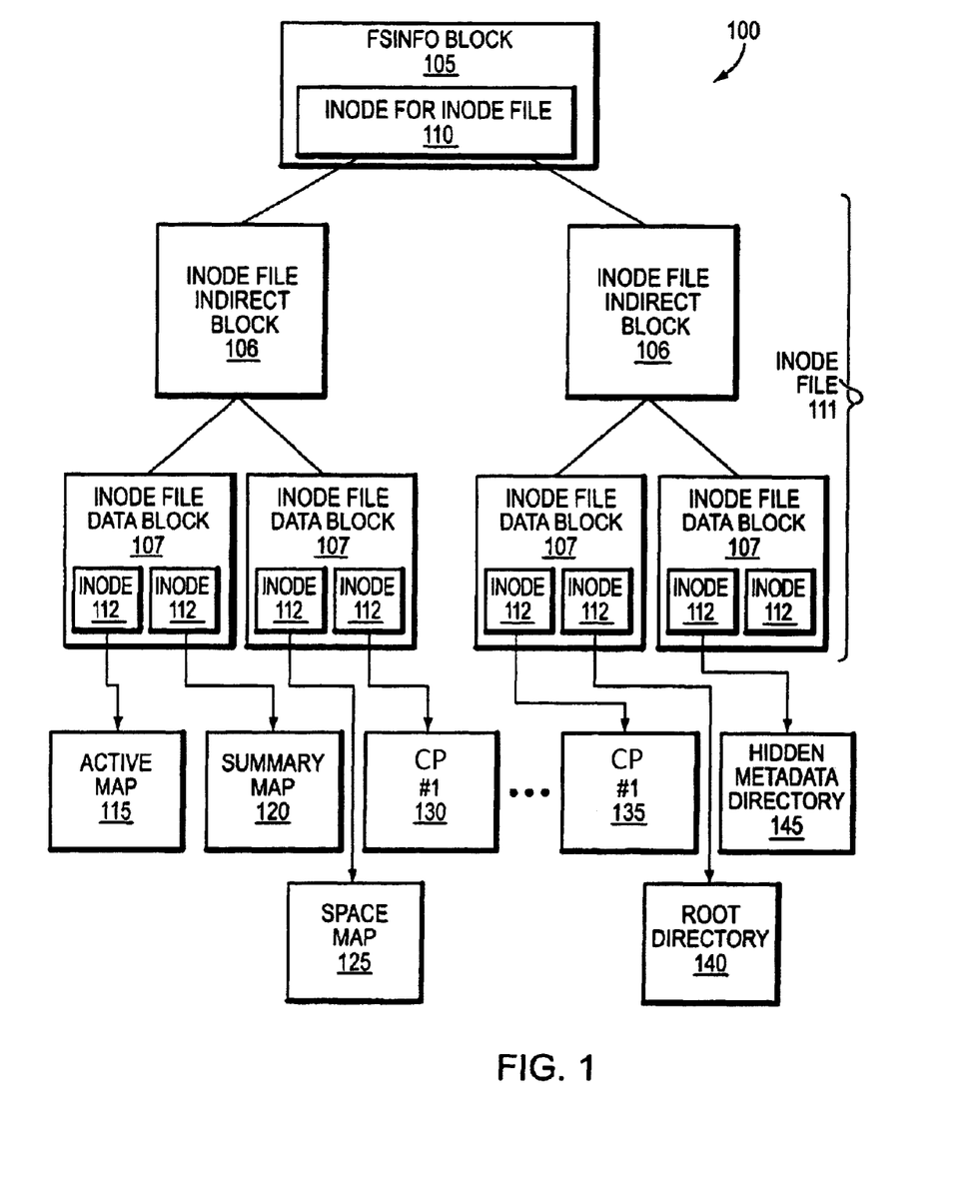
FIG. 1 is a schematic block diagram of an on-disk storage structure of a volume of a storage system.

FIG. 1 is a schematic block diagram of an exemplary on-disk storage structure 100 of a logical volume of a storage system. As noted, a logical volume is typically associated with a file system and comprises data blocks organized within a VBN space. Each logical volume (hereinafter "volume") has a file system information (fsinfo) block that is preferably stored at a fixed location within, e.g., a RAID group. Fsinfo block 105 is the root of the on-disk storage structure 100, illustratively at VBNs 1 and 2. When loading the volume, the storage operating system accesses those VBNs to acquire the fsinfo block 105.

The fsinfo block 105 includes a variety of metadata that describes the state of the file system; also included in the fsinfo block 105 is an inode for an inode file 110. Inodes of the write-anywhere file system are organized into the inode file 111. Like any other file, the inode of the inode file is the root of the buffer tree that describes the location of blocks of the file. As such, the inode of the inode file may directly reference (point to) data blocks 107 of the inode file 111 or may reference indirect blocks 106 of the inode file 111 that, in turn, reference data blocks of the inode file. In this example, the inode for the inode file 110 includes an exemplary buffer tree comprising a plurality of inode file indirect blocks 106 that, in turn, point to inode file data blocks 107. Within each data block of the inode file are inodes 112, each of which serves as the root of a file. Among the inodes of the inode file 110, there are inodes for special metadata files, such as an active map 115, a summary map 120, a space map 125, a root directory 140 and a metadata directory 145. All user files in the file system are organized under the root directory 140, while various metadata files associated with the file system are stored under the metadata directory 145.

The inode file may further include inodes that reference a plurality of consistency points 130, 135. These consistency point inodes are the root level inodes of consistency points of the active file system. Each volume has special reserved inode numbers within its VBN space; a plurality of those inode numbers (e.g., 31) is reserved for consistency points. When a consistency point is generated of the active file system, a copy of the inode for the inode file is generated (hereinafter the "consistency point root") and assigned one of the reserved consistency point inode numbers. Thus, to access a consistency point at a particular point in time, the storage operating system accesses the appropriate consistency point root of the consistency point.

With system-wide static consistency points, the system is incapable of preventing one volume from consuming all or most of the resources leaving none for other volumes. When this occurs and the volume is unable to release buffers and non-volatile logs (NVLogs) in a timely manner, and operations for that volume experience latency due to lack of resources. Further, other volumes experience operational latency due to the behavior of this volume. Adding to the unpredictable nature of consistency points are the storage server internal operations, which may run during the consistency point. These internal workloads generate more work for the running consistency point, leading to unpredictable consistency point duration, which translates to inconsistent performance within the storage server. The present disclosure is directed to alleviating this limitation.

The present disclosure is susceptible of various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method providing dynamic consistency point triggers. As used herein, the term "mass data storage system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof (i.e. a workload), embodied as or including a storage system. Moreover, the teachings of this disclosure can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a write anywhere file system.

It is desirable to improve the performance of storage servers, and one way to do so is by providing dynamic consistency point triggers. Prior to the current disclosure, consistency points may have been triggered for every dirty logical volume (hereinafter "volume") in the system, and thus, the performance of each volume directly affects all other volumes. With this disclosure, a level of isolation between the volumes can be provided by dividing resources between the volumes and allowing the volumes to take consistency points as their resources become exhausted. Aspects of this disclosure are directed to methods, non-transitory computer readable media, and devices for providing consistency point triggers that dynamically adjust to system conditions, for example, the changing throughput of a RAID group or the incoming workload to a volume. These consistency point triggers are designed to make a volume's consistency point duration more predictable and ensure all volumes have the resources needed to continue serving data. In an exemplary steady state, consistency points are triggered for an individual volume based on the resource consumption of the individual volume.

In one embodiment, a resource-partitioning model is the basis of the consistency point trigger design. The partitioning is applied to dirty buffers and the non-volatile log of a storage server, as those are the main resources consumed by write anywhere file system operations that are released by the consistency point. However, the partition model could be extended to include additional resources if necessary. In one embodiment, to partition managed resources, each volume's resource fill rate (i.e. consumption rate) and resource drain rate (i.e. rate of release) is used as an exemplary method of resource partitioning. This allows the system to restrict the resource usage of a volume that is overloaded (i.e. fill rate>drain rate) in favor of a healthy volume. By applying these principles, the partitioning model has built-in support for using a volume's actual write throughput and provides a soft resource guarantee to all volumes. As disclosed herein and according to certain embodiments, each volume receives a portion of dirty buffers based on its contribution to the total system fill rate. The "total system fill rate" is the sum of all volume fill rates. The resource amount allotted to each volume then drives when a consistency point is triggered for the volume.

In another embodiment, internal workloads that generate work for consistency points are dynamically detected and the amount of work each is allowed to generate is restricted. When the storage server attempts to dirty an in-memory buffer, a set of rules is applied to the message, which determines if the running message is an internal workload message. If the criterion is met, the message type is labeled as an internal workload message type. This information is then used when processing new messages to quickly identify an internal workload message. Each buffer dirtied by an internal workload message is accounted for in order to stop new work from being generated when a defined limit is reached, or once the consistency point completes.

Figure 2:
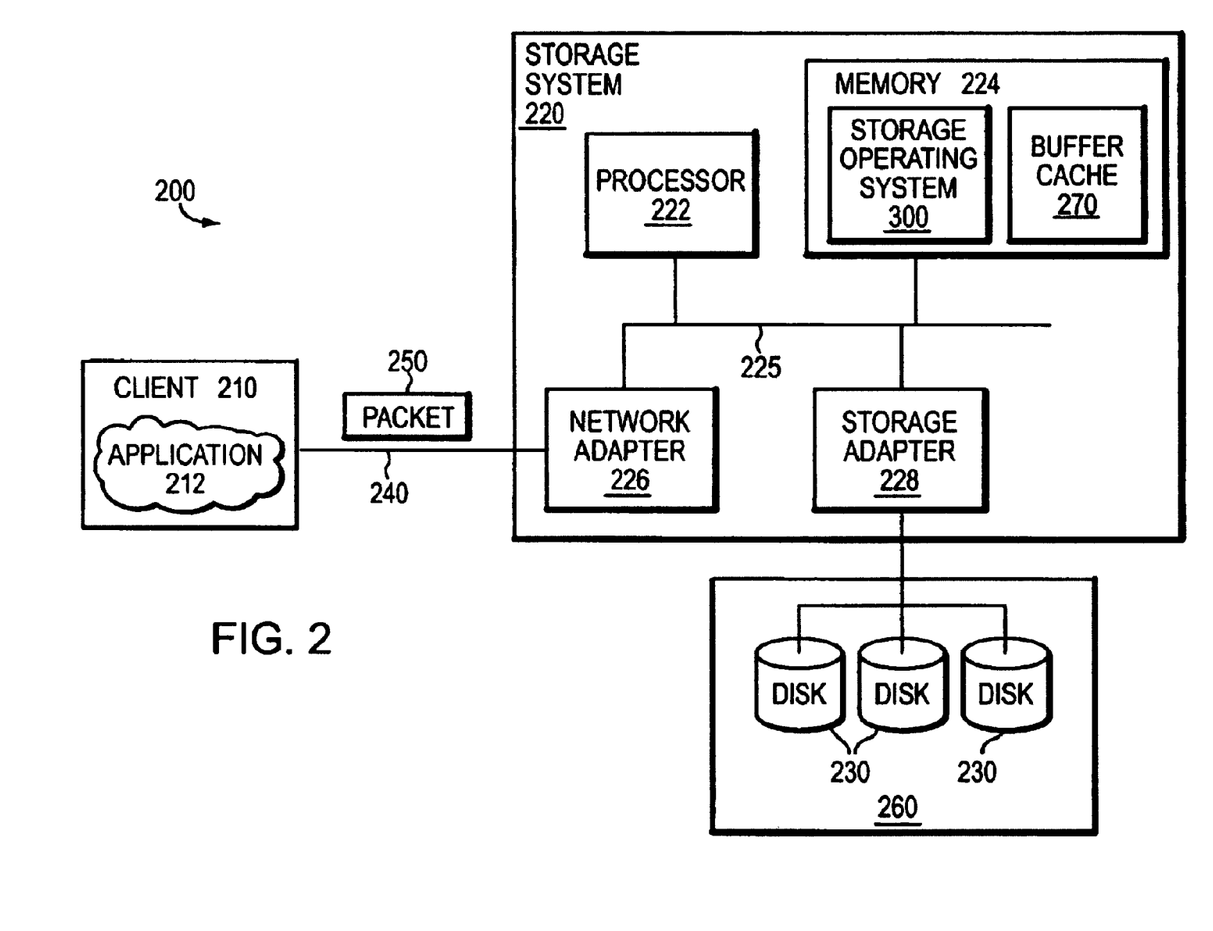
FIG. 2 is a schematic block diagram of an environment including a storage system that may be added advantageously used with the present disclosure.

Referring to FIG. 2, a schematic block diagram of an environment 200 including a storage system 220 that may be advantageously used with the present disclosure. The storage system is a computer that provides storage service relating to the organization of information on storage devices, such as disks 230 of a disk array 260. The storage system 220 comprises a processor 222, a memory 224, a network adapter 226 and a storage adapter 228 interconnected by a system bus 225. The storage system 220 also includes a storage operating system 300 that preferably implements a high-level module, such as a file system, to logically organize the information as a hierarchical structure of directories, files and special types of files called virtual disks (hereinafter "blocks") on the disks.

In the illustrative embodiment, the memory 224 comprises storage locations that are addressable by the processor and adapters for storing software program code. A portion of the memory may be further organized as a "buffer cache" 270 for storing certain data structures associated with the present disclosure. The processor and adapters may, in turn, comprise processing elements and/or logic circuitry configured to execute the software code and manipulate the data structures. Storage operating system 300, portions of which are typically resident in memory and executed by the processing elements, functionally organizes the system 220 by, inter alia, invoking storage operations executed by the storage system. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the storage system 220 to a client 210 over a computer network 240, which may comprise a point-to-point connection or a shared medium, such as a local area network. Illustratively, the computer network 240 may be embodied as an Ethernet network or a Fibre Channel (FC) network. The client 210 may communicate with the storage system over network 240 by exchanging discrete frames or packets of data according to pre-defined protocols, such as the Transmission Control Protocol/Internet Protocol (TCP/IP).

The client 210 may be a general-purpose computer configured to execute applications 212. Moreover, the client 210 may interact with the storage system 220 in accordance with a client/server model of information delivery. That is, the client may request the services of the storage system, and the system may return the results of the services requested by the client, by exchanging packets 250 over the network 240. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 228 cooperates with the storage operating system 300 executing on the system 220 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 230, such as HDD and/or DASD, of array 260. The storage adapter includes input/output (I/O) interface circuitry that couples to the disks over an I/O interconnect arrangement, such as a conventional high-performance, FC serial link topology.

Storage of information on array 260 can be implemented as one or more storage "volumes" that comprise a collection of physical storage disks 230 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 230, the storage operating system 300 implements a write-anywhere file system that cooperates with virtualization modules to "virtualize" the storage space provided by disks 230. The file system logically organizes the information as a hierarchical structure of named directories and files on the disks. Each "on disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

Figure 3:
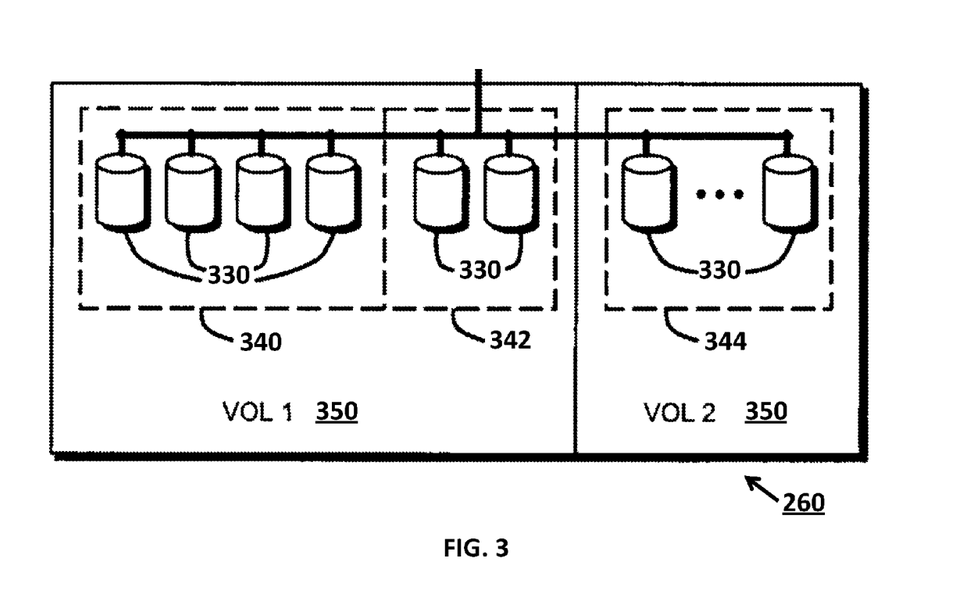
FIG. 3 is a schematic block diagram of the array that may be advantageously used with the present disclosure.

FIG. 3 is a schematic block diagram of the array 260 that may be advantageously used with the present disclosure. Volumes 350 can be isolated by dividing resources 330 between the volumes and allowing them to take consistency points as their resources are exhausted. The array 260 can include one or more storage volumes (e.g., VOL1 & VOL2 350) that include a set of one or more physical storage disks 330, defining an overall logical arrangement of disk space. Specifically, each volume 350 is constructed from an array of physical disks 330 that are for example organized as RAID groups 340, 342, and 344. Each volume 350 receives a portion of dirty buffers based on its contribution to the total system fill rate via the resource partition. The resource partition reflects the total amount of a resource pre-allocated to a volume. This is the sum of the rate partition and the non-rate partition of a given volume. The resource amount allotted to each volume 350 then drives when a consistency point is triggered for the volume 350. Fill rate is the consumption rate of a given resource, such as an NVLog or dirty buffers, by a volume 350. NVLogs are configured to temporarily record ("log") I/O requests, such as write requests. The drain rate is the rate a volume returns a resource, such as the NVLog or dirty buffers. This is measured over the duration of a consistency point. The rate partition is the amount of a resource pre-allocated to a volume based on the fill and drain rate for the corresponding resource.

Figure 4:
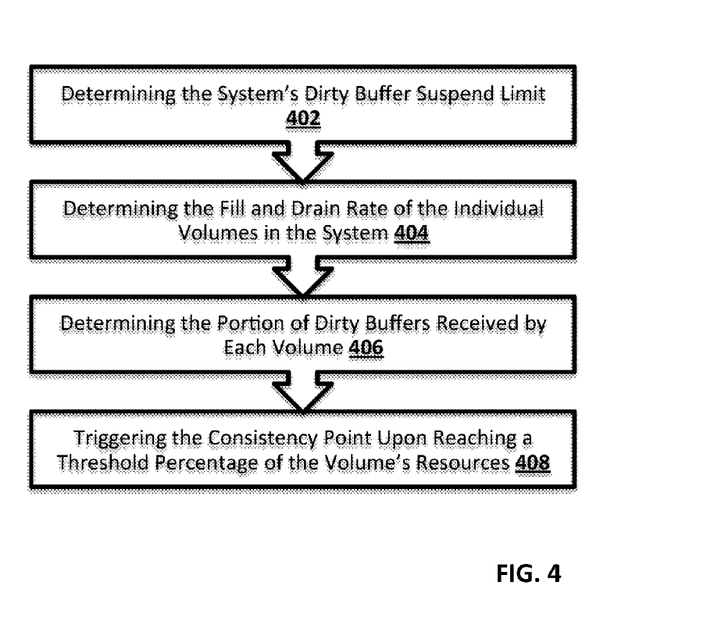
FIG. 4 is an exemplary method for resource partitioning for a specific volume.

An exemplary method for providing dynamic consistency point triggers will now be described with reference to FIGS. 3-4. Referring more specifically to FIG. 4, an exemplary method for resource partitioning for a specific volume is described. To fairly partition managed resources 330, each volume's 350 resource fill rate (i.e. consumption rate) and resource drain rate (i.e. rate of release) can be used to determine proper resource partitioning. This allows the system to restrict the resource usage of a volume that is overloaded (i.e. fill rate>drain rate) in favor of a healthy volume. The following example illustrates the basic concept of partitioning dirty buffers between volumes based on rates. In method 400, each volume receives a portion of dirty buffers based on its contribution to the total system fill rate.

The fill rate is maintained in units of resources per second. The resource amount allotted to each volume then drives when a consistency point is triggered for the volume. The values discussed below set the volume's dirty buffer suspend limit and the consistency point is triggered on a volume when half of the limit is reached. Write/modify operations are halted and /or suspended during a consistency point when the resource limits have been reached. A file system typically completes consistency points before a limit is encountered, specifically the time required to perform write allocation. Under heavy loads involving large files, this time may be on the order of tens of seconds, which significantly impedes access latency for clients of the storage system. This is defined as the dirty buffer suspend limit.

In some embodiments, the resource fill rate is a factor of resource partitioning because it needs to support constant workloads, bursty workloads, and overloaded workloads. To meet these demands more than one fill rate is maintained and special conditions are placed on when these are used. The dirty buffer count used for the fill rate computation is the count of dirty buffers for the next consistency point. The nvlog fill rate count can include numerous sources to cover the various conditions, which impact nvlog usage. The active log size and phantom log size are summed to obtain the sample nvlog usage. The active log size is the actual nvlog usage of the volume for the next consistency point. The phantom log size is the number of bytes added by operations that do not actually consume nvlog for the next consistency point. Phantom log is for an operation to increase the consumed nvlog space of an volume without actually writing data to nvlog. This is used by some features to trigger consistency points based on nvlog usage instead of dirty buffers.

The summation of active log size and phantom log size forms the nvlog count used to compute the nvlog fill rate. By accounting for these sources the volume is capable of obtaining the nvlog partition required and the system maintains the defined behavior of phantom nvlog. The first fill rate used is one that can handle both bursty and constant workloads. It is sampled and computed, for example every 50 milliseconds, based on an exponential moving average with an exemplary smoothing factor of 5.

A second fill rate maintained is the consistency point fill rate. This covers the resource usage over a consistency point time, which is defined as the difference between the start time of the current consistency point and the start time of the previous consistency point. The resource usage over this time period is then used to compute a fill rate. The consistency point fill rate is computed at the start of each volume consistency point, not every 50 milliseconds. Obtaining the volume fill rate includes combining the previously mentioned fill rates with additional logic to handle various scenarios in order to produce a usable fill rate. Some special cases include where the fill rate is greater than the drain rate, where there is no change in the resource consumption, there is reduction in resource consumption from a previous sample (e.g. buffer invalidation), the reduction of phantom log and the messages are suspended for the resource. For example, when the messages are suspended for the resource, the change in resource usage is not an accurate measure of the fill rate. This is due to the burst in messages when the suspended messages are restarted. To handle this case the consistency point fill rate is used to produce a smoother fill rate. Once a volume's resource fill rate is determined it must update the total system resource rate in order for its new rate to be effective. The total fill rate is used to compute the resource rate allocation for the volume during rate partition allocation.

The resource drain rate captures the ability of a volume to release acquired resources during a consistency point. The drain rate is maintained in units of resource per-second. Unlike the fill rate, the drain rate is computed only at the end of the consistency point. This is because the NVLog is released at the end of the consistency point, and the next consistency point resources can only begin to drain once the running consistency point completes.

In step 402, the system's dirty buffer suspend limit is determined. In step 404, the fill and drain rate of the individual volumes in the system are determined. In this example, the system's dirty buffer suspend limit is 10,000 dirty buffers. The first volume (Vol1) drain rate (i.e or rate a volume returns a resource over the duration of the consistency point) is 5,000 dirty buffers per second. The second volume (Vol2) drain rate is 10,000 dirty buffers per second. The Vol1 fill rate, or consumption rate of a given resource (i.e., dirty buffers) by a volume, is 1,000 dirty buffers per second. The Vol2 fill rate is 4000 dirty buffers per second. The total system fill rate is 5,000 (fill rate of Vol1+fill rate of Vol2) dirty buffers per second. These values are shown in the table below.

|  | Vol Drain Rate (dirty buffers/sec) | Vol Fill Rate (dirty buffers/sec) |
| --- | --- | --- |
| Vol1 | 5000 | 1000 |
| Vol2 | 10000 | 4000 |
| System Total |  | 5000 |

In step 406, the portion of dirty buffers received by each volume can be determined based on the total system's dirty buffer suspend limit, the total system fill rate, the individual volume's fill rate, and the individual volume's drain rate. With the above fill rates, the system dirty buffers suspended would be divided between these volumes as, $$Volx = \frac{(\text{system's dirty buffer suspend limit} * \text{volume fill rate})}{\text{total system fill rate}}$$

$$Vol1 = \frac{(10000 * 1000)}{5000} = 2000 \text{ dirty buffers}$$

$$Vol2 = \frac{(10000 * 4000)}{5000} = 8000 \text{ dirty buffers}$$

In step 408, the consistency point is triggered on a volume when a threshold percentage (e.g. 50%) of the limit is hit. These values set the volume's dirty buffer suspend limit and the consistency point is triggered on a volume when half the limit is hit. In this example, given constant rates, the consistency point would trigger on each volume every second (e.g. 10,000 dirty buffers/5000 dirty buffers per sec). A similar application may be made to nvlog to obtain nvlog resource partitioning.

As illustrated above, the resource partitioning model dynamically distributes resources between volumes based on the fill and drain rate of the individual volumes in the system. For this to achieve consistent behavior the fill rates of the volumes must be known. During certain phases of a volume's life it may not be capable of generating a fill rate that represents the actual needs of the volume. These instances include, but are not limited to, failover, boot, mount/unmount, iron, and idling (i.e. zero workload). To handle these scenarios the resource partitioning needs to have two resource allocation types: rate based allocation of resources; and non-rate based allocation of resources.

Figure 5:
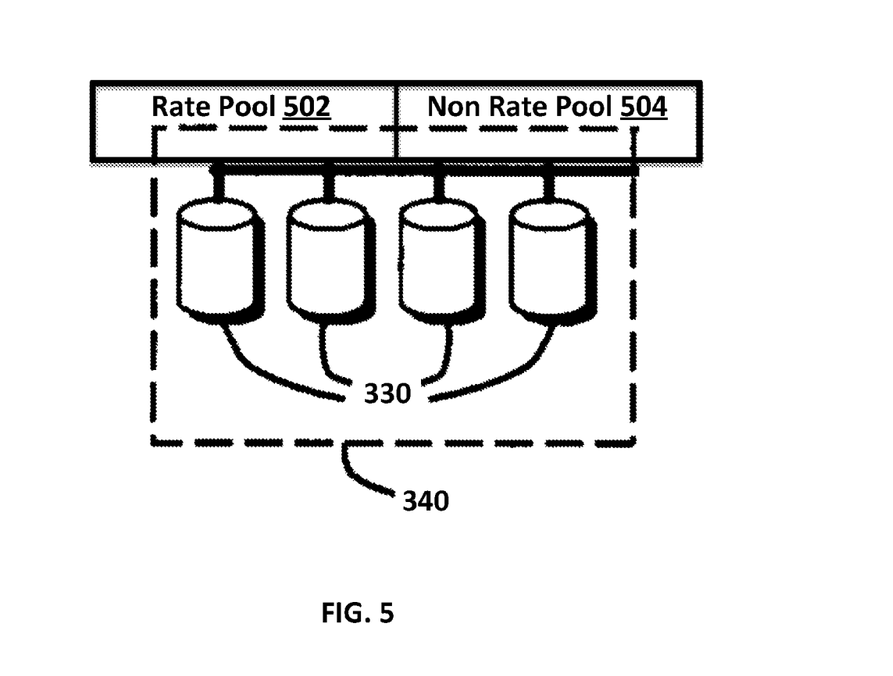
FIG. 5 is a schematic block diagram of a RAID group that may be advantageously used with the present disclosure.

Referring to FIG. 5, a schematic block diagram of a RAID group that may be advantageously used with the present disclosure. Each resource is divided into two pools, a rate pool 502 and a non-rate pool 504. The rate pool 502 is defined as the total number of resource slices minus the resource slices in use by the non-rate pool 504. A resource slice is the minimum amount of a resource allocated to a volume. For example, instead of allocating 1 dirty buffer for a volume, the volume will be allocated a slice, which is 128 dirty buffers. The default slice size of 128 buffers can be implemented to limit resource waste but large enough to accommodate a few operations preventing resource thrashing. The current default size of 128 buffers can be utilized as it matches the smallest nvlog data bucket allocation. As the value of the slice increases the potential for waste across volumes grows so the selection of a slice size must be done meticulously.

The non-rate pool 504 is initially empty; however, it increases in size as slices are removed from the rate pool 502 to satisfy non-rate allocation requests. Note that the sum of the rate allocation and the non-rate allocation must be less than or equal to the total size of the resource. An idle volume (i.e. a volume with zero resource partition) initially allocates the minimum non-idle partition to the non-rate partition of the volume when it transitions to non-idle. This minimum partition stays with the volume while it is non-idle.

The rate pool 502 is defined as the total number of resource slices minus the resource slices in use by the non-rate pool 504. The rate allocation of a volume is based on the individual volume fill rate and the total system fill rate. These inputs are then used to compute a rate allocation for a volume based on the available resources in the rate pool 502. The following invariants must be met as part of the rate allocation: (1) the allocation must be equal to or greater than the current resource consumption of the volume; (2) the allocation must be a multiple of the resource slice; and (3) the allocation must not result in the rate pool exceeding the resource size.

The non-rate pool 504 is initially empty. Non-rate allocation requests are received and the non-rate pool increases in size as slices are removed from the rate pool 502. The non-rate pool 504 shrinks when volumes return non-rate allocations to the rate pool. This occurs when a volume transitions to idle or when a volume begins to allocate from the rate pool. In the second case, non-rate resource slices stay with the volume, but they transition to the rate pool 502, thus shrinking the non-rate pool 504. The non-rate resource allocator is specifically designed to meet the resource needs of volumes that are currently incapable of using the rate allocation. Every non-idle volume can have at least one slice in its non-rate partition which serves as its basis for maintaining a valid resource fill rate (idle aggregates have 0 partition). The volume transitions to idle if the volume is capable of taking a consistency point. Because this is not detected immediately, the resources for the volume may stay in the non-rate pool until the volume completes a consistency point. When the resource transition occurs all non-rate resources except the non-idle minimum allocation are removed. The non-idle allocation remains until the aggregate is declared idle. When a volume transitions from idle to non-idle, the minimum partition is allocated to the volume from the non-rate pool 504. The minimum non-idle allocation will remain with the volume in the non-rate partition while the volume is non-idle. A volume can allocate resources from this pool 504 where the volume is idle; i.e., the volume has zero resource allocation for the resource in question. In this scenario the volume cannot produce a fill rate because it is not allowed to use a resource. In order to provide a fill rate it must first be allowed to use the resource. In another example, a volume can allocate resources from this pool where the volume is not allowed to take a consistency point. In this scenario a volume may have resources in use and can provide a fill rate but since it cannot take a consistency point it must allocate additional resources beyond what has been given since it cannot release and reuse what has been allocated.

Figure 6:
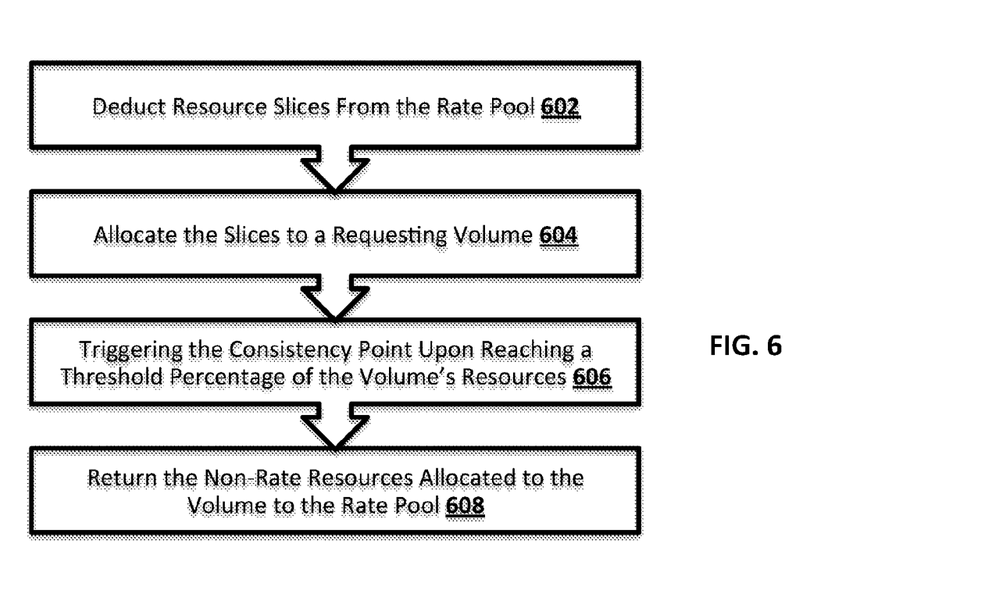
FIG. 6 is an exemplary method for allocating resources to a requesting volume.

An exemplary method for providing dynamic consistency point triggers will now be described with reference to FIGS. 2-3 and 5. Referring more specifically to FIG. 6, an exemplary method for allocating resources to a requesting volume. In method 600, each volume receives a portion of dirty buffers based on rate based allocation and non-rate based allocation. The resource amount given to each volume then drives when a consistency point is triggered for the volume. In 602, resource slices are deducted from the rate pool. In step 604, the slices are allocated to a requesting volume. Resource allocation can occur upon the requests of additional resources at a volume (i.e. exhaustion of resources). Further, when a volume requests additional resources the other volumes can undergo resource reallocation based on the current known partition rates. This may result in an increase or decrease in rate partition for a volume depending on the current partition rates. An allocation may occur at the end of a consistency point due to a volume adjusting its partition based on the new drain rate. Further, an allocation may occur when a volume transitions from idle to non-idle. This will allocate the minimum partition to the volume from the non-rate pool. The minimum non-idle allocation will remain with the volume in the non-rate partition while the volume is non-idle.

In one embodiment, rate pool reallocation is restricted to occur once every 50 milliseconds. This is in place to limit unnecessary partition adjustments across volumes. Rate reallocation does not occur unless the fill rates have changed, which happens every 50 milliseconds, thus the 50 millisecond restriction is in place. Rate pool allocation allocates multiple resource slices to a volume based on the volume to system partition rate ratio. Non-rate pool allocation allocates one slice to a volume at a time. In one embodiment, the purpose of an initial non-rate allocation is to allow the volume to generate a fill rate which can be used to allocate a rate partition. With a starting allocation of 2 times slice size, i.e. 256 buffers, the highest 50 millisecond rate is 5120 dirty buffers per second, which is large enough to get the volume started. This initial allocation must also be selected such that volumes with low load do not consume dirty buffer allocation unnecessarily. As this allocation increases the buffer space available for rate allocation decreases which can lead to performance penalties due to triggering more consistency points.

In step 606, a consistency point is triggered when half of the resource partition is consumed. In step 608, the non-rate resources allocated for a volume are returned to the rate pool 502 when the volume transitions to idle. In one embodiment, the volume transitions to idle if there has been no activity for the resource on a volume for 60 seconds, then the non-rate resource is returned. Thus, requiring the volume to repeat the non-rate allocation process when it transitions to non-idle.

The dynamic consistency point triggers are designed to make a volume's consistency point duration more predictable and ensure all volumes have the resources needed to continue serving data. The consistency point time target is a constant maximum desired consistency point time. Meeting this time target is achieved by limiting the dirty buffers accepted in each consistency point.

With this time target defined a non-overloaded volume will conform to the time target thus preventing extremely long consistency points which may have unforeseen consequences (i.e. even when no client modify operations suspend for dirty buffers nor nvlog resources). In order to provide a soft time target guarantee, the consistency point is triggered before completely filling the time limited dirty buffer maximum. So the target consistency point time is actually half the defined maximum consistency point time target. In an exemplary embodiment, the default duration is thirty (30) seconds, which translates to a defined maximum time of sixty seconds (i.e. time when a resource is completely full). This target time is selected to prevent extreme modify operation outages and may be reduced if needed. The overhead of executing a consistency point and the metadata costs surrounding frequent smaller consistency points can be considered when selecting a time target. In some cases consistency points may actually run for 20-40 seconds without exhausting resources, then not be in consistency point for a few seconds. When the time target is reduced the behavior of this example volume can change such that all resources are exhausted prior to a consistency point completing. In this situation, the front-end workload's fill rate is greater than the consistency point's drain rate. If the fill rate is not throttled by admission control, client modify operations will suspend during consistency point for resources. The suspension time is observed as no-modify-op window. Specifically, client modify operations are suspended for resources because a consistency point is taking too long. In the back-to-back consistency point case, by reducing time to a smaller, fixed time, a long consistency point is broken into multiple smaller consistency points and the no-write-op window is shortened.

The time restricted dirty buffer limit strives to limit consistency point time to a defined duration of time. This is achieved through measurement of back-end write performance, and then by limiting the amount of work given to a consistency point such that it can be completed in that time frame. The work given to a consistency point is a combination of client write and internal write operations. The write workload can be defined as dirty buffers for consistency point to clean.

Internal workloads that generate work for consistency points are dynamically detected and the amount of work each is allowed to generate is restricted. When the storage server attempts to dirty an in-memory buffer, a set of rules is applied to the message, which determines if the running message is an internal workload message. If the criterion is met the message type is labeled as an internal workload message type. This information is then used when processing new messages to quickly identify an internal workload message. Each buffer dirtied by an internal workload message is accounted for in order to stop new work from being generated when a defined limit is reached, or once the consistency point completes.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

What is claimed:

1. A method comprising:
    determining a volume's performance to utilize resources based on a resource fill rate and a resource drain rate of the volume, wherein determining the volume's performance comprises identifying a current contribution of the volume to a fill rate of the entire storage system, wherein the fill rate of the entire storage system is a sum of all volume fill rates:
    wherein a greater current contribution of the volume to the fill rate of the entire storage system indicates a more desirable volume performance;
    assigning to the volume an allocation of divided resources based on total system resources available within a storage server and the volume's performance; and
    triggering a consistency point based on resource consumption of the volume.

2. The method of claim 1, further comprising restricting an internal workload within the volume when performing the consistency point.

3. The method of claim 1, further comprising restricting an internal workload upon exhausting a threshold percentage of the received portion of resources.

4. The method of claim 1, wherein assigning to the volume an allocation of divided resources further comprises;
    assigning resources through a rate based allocation and non-rate based allocation of the volume, wherein the rate based allocation and the non-rate based allocation varies.

5. The method of claim 4, wherein the rate based allocation and the non-rate based allocation varies every 50 milliseconds.

6. A computing device, comprising:
    a memory containing machine readable medium comprising machine executable code having stored thereon instructions for performing a method;
    a processor coupled to the memory, the processor configured to execute the machine executable code to cause the processor to:
    determine a volume's performance to utilize resources based on a resource fill rate and a resource drain rate of the volume, wherein determining the volume's performance comprises identifying a current contribution of the volume to a fill rate of the entire storage system, wherein the fill rate of the entire storage system is a sum of all volume fill rates:
    wherein a greater current contribution of the volume to the fill rate of the entire storage system indicates a more desirable volume performance;
    assigning to the volume an allocation of the divided resources based on total system resources available within a storage server and the volume's performance; and trigger a consistency point based on resource consumption of the volume.

7. The computing device of claim 6, further comprising restricting an internal workload within the volume when performing the consistency point.

8. The computing device of claim 6, further comprising restricting an internal workload upon exhausting a threshold percentage of the received portion of resources.

9. The computing device of claim 6, wherein assigning to the volume an allocation of divided resources further comprises; assigning resources through a rate based allocation and non-rate based allocation of the volume, wherein the rate based allocation and the non-rate based allocation varies.

10. The computing device of claim 9, wherein the rate based allocation and the non-rate based allocation varies every 50 milliseconds.

11. A non-transitory machine-readable medium having stored thereon instructions for performing a method comprising machine executable code which when executed by at least one machine, causes the machine to:

determine a volume's performance to utilize the resources based on a resource fill rate and a resource drain rate of the volume, wherein determining the volume's performance comprises identifying a current contribution of the volume to a fill rate of the entire storage system via determining a resource partition, wherein the fill rate of the entire storage system is a sum of all volume fill rates:

wherein a greater current contribution of the volume to the fill rate of the entire storage system indicates a more desirable volume performance;

receive an allocation of the divided resources based on total system resources available within a storage server and the volume's performance; and trigger a consistency point upon exhausting a threshold percentage of the received/allocated resources.

12. The non-transitory computer readable medium of claim 11, further comprising restricting an internal workload within the volume when performing the consistency point.

13. The non-transitory computer readable medium of claim 11, further comprising restricting an internal workload upon exhausting a threshold percentage of the received portion of resources.

14. The non-transitory computer readable medium of claim 11, wherein assigning to the volume an allocation of divided resources further comprises; assigning resources through a rate based allocation and non-rate based allocation of the volume, wherein the rate based allocation and the non-rate based allocation varies.

* * * * *